United States Patent [19]

Crane et al.

[11] Patent Number: 4,698,140

[45] Date of Patent: Oct. 6, 1987

[54] TECHNIQUES FOR PREPARING MAGNETIC PARTICLES HAVING UTILITY IN RECORDING MEDIA

[75] Inventors: Jacob Crane, Woodbridge; George J. Muench, West Haven; Yousef Saleh, Branford; Lifun Lin, Hamden, all of Conn.

[73] Assignee: Olin Corporation, New Haven, Conn.

[21] Appl. No.: 947,059

[22] Filed: Dec. 29, 1986

Related U.S. Application Data

[63] Continuation-in-part of Ser. No. 803,379, Dec. 2, 1985, Pat. No. 4,657,583, which is a continuation-in-part of Ser. No. 773,484, Sep. 9, 1985, abandoned.

[51] Int. Cl.$^4$ .............................................. C25F 5/00
[52] U.S. Cl. ................................................... 204/146
[58] Field of Search ................................. 204/146, 10

[56] References Cited

U.S. PATENT DOCUMENTS

| | | | |
|---|---|---|---|
| 4,257,830 | 3/1981 | Tsuya et al. | 148/112 |
| 4,274,865 | 6/1981 | Suzuki et al. | 75/0.5 AA |
| 4,290,799 | 9/1981 | Schroeder et al. | 75/0.5 A |
| 4,461,685 | 7/1984 | Pryor | 204/146 |

*Primary Examiner*—T. M. Tufariello
*Attorney, Agent, or Firm*—Paul Weinstein

[57] ABSTRACT

The present invention relates to techniques for producing magnetic particles for use in recording media. The process of the present invention generally comprises providing an alloy capable of forming a magnetic precipitate, aging the alloy to form a magnetic precipitate comprising a plurality of magnetic particles dispersed throughout a surrounding matrix; and dissolving the matrix to leave the magnetic particles. The dissolution of the matrix is done electrochemically using a pyrophosphate solution.

14 Claims, No Drawings

TECHNIQUES FOR PREPARING MAGNETIC PARTICLES HAVING UTILITY IN RECORDING MEDIA

This application is a continuation-in-part of U.S. patent application Ser. No. 803,379, to Crane et al., filed Dec. 2, 1985, now U.S. Pat. No. 4,657,583 which is a continuation-in-part of abandoned U.S. patent application Ser. No. 773,484, also to Crane et al., filed Sept. 9, 1985, now abandoned. This application is also related to co-pending U.S. patent application Ser. No. 773,769, filed on Sept. 9, 1985, to Lin, now U.S. Pat. No. 4,668,355.

The present invention relates to magnetic particles for magnetic recording media.

The goal of magnetic recording technology is to write a magnetization pattern onto a magnetic medium and then read the pattern at some later time. The essential components of a recording system are the read/write head, the magnetic medium, the mechanical systems which manipulate the head and/or the media, and the electronics which process the input and output signals. The magnetic medium is typically a dispersion of ferromagnetic particles in an organic binder which is coated onto a substrate. The substrate can be a polyester such as MYLAR for flexible media or metal such as aluminum alloy 7075 for rigid disks.

The requirements for such magnetic media include: (1) that the magnetization direction of the media can be altered by the head during writing; and (2) that a large stable magnetization be retained for reading. The two most important magnetic characteristics of the media are the magnetization which remains after the applied field is removed and the applied field necessary to reduce the net magnetization to zero. These are called the remanent magnetization and the coercive field, respectively.

Media with high magnetization are desired because all other things being equal, higher magnetization yields a higher signal to be read. In a well prepared media with preferentially aligned particles, the remanent magnetization is about 90% of the saturation magnetization. The magnetic stability of the media is a function of its coercive field. Generally, the coercive field is at some intermediate value between two limits defined by the following considerations. If the coercive field is too large, the magnetic field generated by the write head is insufficient to alter the media. If, however, the coercive field is too small, the media is easily demagnetized and the recorded pattern is not stable. Thus, the general aim in the development of new magnetic materials for recording purposes is to develop materials characterized by a relatively high coercive field and saturation magnetization.

Various magnetic powder materials have been proposed for use in preparing magnetic recording media. These materials include $\gamma$-$Fe_2O_3$, Co-doped $\gamma Fe_2O_3$, $Fe_3O_4$, Co-doped $Fe_3O_4$, $Fe_3O_4$-$\gamma$-$Fe_2O_3$, and $CrO_2$. However, the magnetic characteristics of these materials are generally insufficient to achieve the high density recordings sought by the recording industry. As a result, attention has focused on ferromagnetic metal and alloy materials as being most promising to achieve the aims of the recording industry.

U.S. Pat. Nos. 4,274,865 to Suzuki et al. and 4,290,799 to Schroeder et al. illustrate prior art processes for preparing ferromagnetic metal or alloy powder materials. In the Suzuki et al. approach, a magnetic powder consisting mainly of iron is produced by applying or absorbing or depositing one or more compounds of zinc, chromium, and copper on a particulate iron oxyhydroxide or oxide material and then reducing the thus treated material with a reducing gas such as hydrogen to form a magnetic powder consisting mainly of iron. The Schroeder et al. approach produces a metal powder consisting essentially of acicular iron particles by precipitating and oxidizing an aqueous iron (II)-salt solution to produce finely divided acicular iron (III)-oxide-hydroxide; stabilizing the iron (III)-oxide-hydroxide by treatment with cadmium, lead, calcium, magnesium, zinc, aluminum, chromium, tungsten, a phosphorous oxide and/or a boron oxide; converting the stabilized material into ferromagnetic iron oxide; and reducing it to metallic iron with a gaseous reducing agent.

Other approaches for forming magnetic particles include vacuum evaporation, thermal decomposition of carbonyls, and reduction by borohydrides of iron in solution. Still another approach employs rapid solidification techniques to form thin metallic ribbons containing magnetic particles. In this approach, a melt containing magnetic material is formed and ejected under pressure onto a moving or rotating cooling substrate. As soon as the molten material contacts the cooling substrate, the melt quickly cools and solidifies into a thin ribbon. The magnetic particles are distributed therein. U.S. Pat. Nos. 4,257,830 to Tsuya et al. and 4,461,685 to Pryor illustrate the use of rapid solidification technology to form magnetic particles. While rapid solidification techniques produce magnetic particles of good quality, their primary deficiency is their inability to produce particles having identical or substantially similar sizes. From the standpoint of forming particles having substantially uniform magnetic properties, it is highly desirable to employ a technique that forms substantially uniformly sized magnetic particles. Particle size tends to define the magnetic properties of the particle and substantially identically sized particles exhibit substantially identical magnetic properties. Non-identical sized particles may cause unwanted noise problems.

The size and morphology of the magnetic particles can be used to control the magnetic properties of the particle. All other things being equal, it has been found that there is a critical size for maximum coercivity. At this critical size, particles are uniformly and permanently magnetized and are said to have a single magnetic domain. For iron particles at room temperature, this critical size is about 300Å. Particles larger than the critical size contain a plurality of magnetic domains. Magnetization changes in multi-domain particles require less energy and therefore, have a lower coercive field than single domain particles. Particles smaller than the critical size are susceptible to thermal fluctuations in their magnetization direction which can spontaneously demagnetize a particle assembly. Particle morphology is important in that acicular single domain particles have been found to provide a higher coercive field than spherical particles. Furthermore, the magnetization direction tends to lie along the the long axis of the particle. This shape anisotropy may be used to control the coercive field of magnetic recording particles. For example, the calculated coercive field of ellipsoidal iron particles with aspect ratios of 1.1:1 and 1.2:1 are about 700 Oe and 2000 Oe respectively.

Accordingly, it is an object of the present invention to provide magnetic particles to be used in recording media.

It is a further object of the present invention to provide an improved method for forming such magnetic particles.

It is yet a further object of the present invention to provide a method as above for forming magnetic particles for use in recording media.

It is yet a further object of the present invention to provide a method as above for forming free acicular magnetic particles characterized by a substantially uniform composition and a relatively smooth surface.

These and further objects and advantages will become more apparent from the following description.

The present invention relates to the production of passivated free magnetic particles for use in recording media. While the magnetic particles may be produced in any desired manner, they are preferably formed by providing an alloy capable of forming a magnetic precipitate upon thermal aging; aging the alloy to form the magnetic precipitate in a surrounding matrix; and thereafter dissolving the matrix to leave the magnetic particles. The particles are extracted from the matrix electrochemically using a pyrophosphate solution containing copper and nickel. One of the advantages of this approach is that it may be used with a wide variety of starting materials. For example, it could be used with a number of copper-base, iron-base, nickel-base, gold-base and manganese-base alloy systems.

The magnetic particles produced by the method of the present invention have been found to exhibit improvement in many of the features and properties desired by the recording industry. For example, the particles are acicular in shape, chemically stable, and single magnetic domain particles. The particles are further characterized by a relatively smooth surface which is significant from a magnetization per unit volume standpoint and a face centered cubic structure. Additionally, the particles are substantially uniform in composition. The ability to produce nearly identical particles having a substantially uniform composition is very desirable from the standpoint of having particles with improved magnetic properties.

As previously discussed, the present invention relates to the formation of passivated free magnetic particles for use in recording media. The magnetic particles are preferably formed by a thermal treatment. It has been surprisingly found that by using a thermal treatment better control of the particles' magnetic and physical properties such as size can be obtained. While the present invention will be described in detail with reference to a particular copper-base alloy starting material and the formation of ferromagnetic particles, it should be recognized that the present invention has broad application to a wide variety of materials and the formation of a wide variety of different types of magnetic particles including iron particles to be used in recording media.

It has been found that magnetic particles having improved magnetic properties may be formed by starting with a material capable of forming a magnetic precipitate by thermal aging. This is because a magnetic precipitate so formed is usually characterized by the presence of acicular magnetic particles. Suitable starting materials include copper-base alloy systems such as copper-iron-nickel, copper-iron-nickel-aluminum, and copper-nickel-cobalt; iron-base alloy systems such as iron-chromium-cobalt, iron-nickel-aluminum, and iron-platinum; gold-base alloy systems such as gold-iron-nickel; manganese-base alloy systems; and nickel-base alloy systems. A particular alloy system which has been found to be quite useful for forming ferromagnetic particles is a copper-base alloy consisting essentially of from about 10% to about 40% iron, from about 10% to about 40% nickel, and the balance essentially copper. If desired, the copper-base alloy may also contain from an effective amount up to about 40% of at least one element selected from the group consisting of cobalt, chromium, zirconium, magnesium and manganese either as additional element(s) for assisting in alloy casting and/or processing or as substitutes for some of the iron and/or nickel content of the alloy. The foregoing percentages are weight percentages.

The selected starting material may be processed initially in any desired conventional manner into any desired form such as into strip material or rod form. For example, a base metal may be melted and desired alloying additions may be made to the melt in accordance with conventional practices. The melt may then be cast in any desired manner. After being cast, the starting material may be homogenized and quenched, hot worked such as by hot rolling and/or cold worked such as by cold rolling until the material has reached a desired gage. If desired, the material may be subjected to one or more interanneals during processing. For example, the aforementioned copper-base alloy may be processed as follows. After casting, the alloy may be homogenized at a temperature above about 1000° C. for about 30 minutes to about 350 hours, cooled to room temperature at a cooling rate that preferably doesn't impair subsequent cold workability, and then cold worked, e.g. cold rolled. This processing cycle may be repeated one or more times until the material reaches a desired gage. The foregoing processing steps may be carried out in any suitable manner known in the art.

After the material has been processed to the desired gage, the material is preferably solution heat treated and quenched. Both solution heat treatment and quenching of the material may be performed in any suitable manner known in the art. For the aforementioned copper-nickel-iron alloy system, the solution heat treatment step may be performed at a temperature in the range of from about 950° C. to about 1200° C. for a time in the range of from less than about 1 minute to about 48 hours. Preferably, the solution heat treatment is carried out at a temperature in the range of from about 1000° C. to about 1100° C. for a time in the range of from about 1 minute to about 4 hours. For certain alloy systems, the solution heat treating and quenching steps may be omitted since the quenching after hot working serves the same purpose.

The final step of the material processing comprises thermal treatment of the material to produce magnetic particles. It has been discovered that one can form a magnetic precipitate, preferably comprising acicular magnetic particles, by thermal aging of the processed starting material and that the magnetic and physical properties exhibited by these particles are typically significantly better than the properties of particles produced by other techniques. Any suitable thermal aging technique known in the art including isothermal aging, controlled cooling, and programmed temperature aging may be used to practice the present invention and form the magnetic precipitate. Of course, certain materials lend themselves to certain aging techniques and the choice of a particular aging technique may be limited by the material being processed. Preferably, the aging technique employed is performed in a single step and forms a magnetic precipitate comprising a plurality of acicular magnetic particles dispersed throughout a matrix.

For the copper-nickel-iron alloy system discussed above, thermal aging separates or decomposes the alloy into a copper-rich matrix and iron-nickel rich magnetic particles. It has been found that the magnetic particles tend to have a composition consisting essentially of from about 35% to about 60% nickel, up to about 15% copper, and from about 35% to about 65% iron. Other elements may be present in relatively small amounts depending upon the composition of the starting material. For this copper-base alloy system, thermal aging may be carried out at a temperature in the range of from about 500° C. to about 800° C., preferably at a temperature in the range of from about 500° C. to about 700° C. for a time period up to about 48 hours, preferably a time in the range of from about 1 to about 8 hours.

When processing certain alloy systems, it may be desirable to cold work, e.g. cold roll, the material just prior to the thermal aging step to affect the morphology and size of the particles and the type of precipitate to be formed. For example, it has been found that magnetic particles formed in accordance with the present invention have improved magnetic properties after cold working and subsequent aging. The degree of cold work applied to the material will of course depend upon the desired particle properties and/or to assist the subsequent separation of the particles from the matrix. Cold reductions up to about 99% have been found to increase coercivity through an increase in aspect ratio. Preferably, cold reductions in a range of from about 50% to about 95% are used.

The magnetic precipitates or particles are recovered from the matrix by dissolving the matrix and collecting the passivated free magnetic particles which are usually in powder form. Passivation of the magnetic particles is desirable to prevent further oxidation and corrosion of the particles. Generally, a passive layer comprises an oxygen impervious barrier such as an oxide layer about each particle. Dissolution of the matrix is performed using an electrochemical dissolution technique which does not cause any substantial dissolution of the magnetic particles themselves.

The present invention makes use of the discovery that pyrophosphate solutions are particularly useful in electrochemically extracting magnetic particles from a surrounding matrix and forming passivated particles during extraction. These useful pyrophosphate solutions include aqueous solutions having or consisting of a pyrophosphate ion concentration in a range of from about 0.5M to about 1.5M, a copper concentration in the range of from about an amount effective to assist in plating out copper up to about 0.75M, a nickel concentration in the range of from an amount effective to assist in plating out nickel up to about 0.75M, and the balance essentially water. Preferably, the solution consists of a pyrophosphate ion concentration in a range of from about 1.0M to about 1.4M, copper and nickel concentrations each in a range of from about 0.2M to about 0.5M, and the balance essentially water. The pyrophosphate may be added either in a salt form such as copper or potassium pyrophosphate and/or in an acid form. Copper and nickel are preferably added in the form of a copper salt such as copper pyrophosphate and a nickel salt such as nickel sulfamate. These solutions generally have a pH greater than about 8 and preferably have a pH in the range of from about 8 to about 9.

The pyrophosphate solutions described above are used as an electrolyte in an electrolytic cell containing two or more electrodes. The material containing the copper-rich matrix and the iron-nickel rich magnetic particles are immersed in the pyrophosphate electrolyte solution while an electrical current having a current density in a range of from about 10 mA/cm$^2$ to about 30 mA/cm$^2$ is passed between the electrodes. The solution extracts the magnetic particles usually in powder form from the positive electrode or anode and plates out copper and nickel at the negative electrode or cathode. During electrolysis, the pyrophosphate electrolyte is maintained at a temperature in the range of from about room temperature to about 50° C. The electrolytic cell may be provided with any suitable heating/cooling loop known in the art to maintain the electrolyte at the desired temperature.

As the matrix is dissolved, the free magnetic particles may be collected in any desired manner. The collected particles may be rinsed in water or some other rinse solution after removal from the electrolyte to remove any unwanted chemical contaminants. It has been found that particles produced electrochemically in this manner have magnetic properties close to those of chemically extracted particles.

The particles formed in accordance with the present invention exhibit many of the characteristics desired for recording media. For example, they are acicular in shape and are characterized by a saturation magnetization greater than about 80 EMU/g, preferably in the range of from about 85 EMU/g to about 150 EMU/g, a coercive field in the range of from about 300 Oe to about 2000 Oe, preferably from about 500 Oe to about 1500 Oe, and substantially uniform aspect ratios up to about 10:1, preferably in the range of from about 1.1:1 to about 8:1.

It has generally been found that the lower the copper content of the particles, the better the magnetic properties. Particles having a metal composition consisting of from about 35% to about 55% nickel, from about 1% to less than about 9% copper, and the balance essentially iron tend to exhibit better magnetic properties. The foregoing percentages are weight percentages.

The particles formed in accordance with the present invention also have a wholly face centered cubic structure except for any surface oxides. Surface oxides, if present, tend to have an indeterminate crystallographic structure. The particles are further characterized by a substantially uniform composition throughout and a relatively smooth surface. The particles are also in an aged condition. The phrase aged condition as used herein means the condition resulting from an aging process. Still further, the particles are chemically stable, a somewhat surprising result, are single magnetic domain particles, and exhibit a length in the range of from about 50Å to about 4000Å, preferably from about 100Å to about 3000Å . As a result of these characteristics, the particles produced by the present invention tend to exhibit substantially uniform magnetic properties.

The ability to produce a particle having a relatively smooth surface is particularly significant in that such particles exhibit an increase in magnetization per unit volume and reduced noise. The ability to produce particles having a tendency toward a substantially identical nature is important from the standpoint of reducing noise problems.

Recording media, incorporating the magnetic particles of the present invention may be formed by placing the particles in powder form into a dispersion and coating an appropriate substrate material with the dispersion and thereby forming a magnetic layer on the substrate. Such a magnetic layer generally comprises a plurality of magnetic particles dispersed in a binder material such as a polyurethane. The magnetic layer may also contain a dispersant such as lecithin, a lubricant, conductive pigments, solvents and/or abrasives. The type of substrate material used of course depends upon the type of recording media to be formed. For example, the substrate material may be aluminum or an aluminum alloy for rigid media or a plastic material such as polyethylene terephthalate for flexible media. Any suitable method known in the art may be used to form the recording media. The particular method employed does not form part of the present invention. To illustrate the present invention, the following example was performed.

EXAMPLE I

An alloy having a composition consisting essentially of 15% iron, 15% nickel, 0.2% magnesium and the balance essentially copper was prepared. A sample of the alloy was homogenized at 1100° C. for 24 hours and cooled. The alloy sample was then cold rolled about 70%, heat treated at 1100° C. for 2 hours and rapidly cooled to insure homogeneity. Prior to being subjected to an aging treatment, the sample was further cold rolled to obtain a 50% reduction. Then, the material was thermally aged at 650° C. for 4 hours to effect decomposition of the homogenized material into ferromagnetic particles in a copper-rich matrix.

The material thus prepared was broken into two groups. The copper-rich matrix in each group was electrolytically dissolved using an aqueous pyrophosphate solution containing 1.375M potassium pyrophosphate, 0.3M nickel sulfamate, and 0.125M copper pyrophosphate. The solution had a pH of 9 and was kept at a temperature of 50° C. The sample forming the first group was immersed in the pyrophosphate solution and a current density of 12mA/cm$^2$ was applied to a cathode and an anode also immersed in the solution. The magnetic particles recovered from this first group exhibited a saturation magntization of 108.6 EMU/g and a coercive field of 644 Oe.

The sample forming the second group was immersed in the same pyrophosphate solution and a current density of 18 mA/cm$^2$ was applied to the electrodes. The magnetic particles recovered from this group exhibited a saturation magnetization of 98 EMU/g and a coercive field of 690 Oe.

It is believed that the foregoing example illustrates the improved magnetic particles which can be obtained by the present invention.

While it is preferred that the thermal aging step be the final processing step before dissolution of the matrix, it may be necessary with some alloy systems to further cold work the material after the thermal aging treatment to assist the dissolution process.

While a particular technique for forming magnetic particles has been illustrated, it should be recognized that the pyrophosphate solution of the present invention may be used to passivate other types of magnetic particles. For example, the solution may be used to form passivated iron particles.

The patents set forth in the specification are intended to be incorporated by reference herein.

It is apparent that there has been provided in accordance with this invention techniques for preparing ferromagnetic particles having utility in recording media which fully satisfy the objects, means, and advantages set forth hereinbefore. While the invention has been described in combination with specific embodiments thereof, it is evident that many alternatives, modifications, and variations will be apparent to those skilled in the art in light of the foregoinc description. Accordingly, it is intended to embrace all such alternatives, modifications, and variations as fall within the spirit and broad scope of the appended claims.

What is claimed:

1. A process for forming passivated free magnetic particles, said process comprising:
   forming a plurality of magnetic particles,
   providing an electrolytic cell containing two electrodes and an aqueous pyrophosphate solution electrolyte;
   immersing said particles in said electrolyte, and
   applying a current having a current density in the range of from about 10 mA/cm$^2$ to about 30 mA/cm$^2$ to form said passivated particles.

2. The process of claim 1 wherein:
   said particle forming step comprises forming a magnetic precipitate comprising a plurality of magnetic particles dispersed in a matrix; and
   said current applying step causing dissolution of said matrix.

3. The process of claim 1 wherein said immersing step comprises immersing said particles in an aqueous solution having a pH greater than about 8, a pyrophosphate ion concentration in a range of from about 0.5M to about 1.5M, a copper concentration in a range of from an effective amount up to about 0.75M, and a nickel concentration in a range of from an effective amount up to about 0.75M.

4. The process of claim 1 wherein said immersing step comprises immersing said particles in an aqueous solution having a pH in a range of from about 8 to about 9, a pyrophosphate ion concentration in a range of from about 1.0M to about 1.4M, a copper concentration in a range of from about 0.2M to about 0.5M, and a nickel concentration in a range of from about 0.2M to about 0.5M.

5. The process of claim 1 further comprising:
   maintaining said electrolyte at a temperature in the range of from about room temperature to about 50° C.

6. The process of claim 2 wherein said magnetic precipitate and matrix forming step comprises:
   providing a metallic material capable of forming a magnetic precipitate by aging; and
   thermally aging said metallic material to form said magnetic particles dispersed in said matrix.

7. The process of claim 6 further comprising:
   solution heat treating and quenching said metallic material prior to said aging step.

8. The process of claim 6 further comprising:
   working said material up to a reduction of about 99% prior to said aging step to affect particle morphology and size and/or assist in said material processing.

9. The process of claim 8 wherein said working step comprises cold rolling said material and obtaining a reduction in a range of from about 50% to about 95%.

10. The process of claim 6 wherein said metallic material providing step comprises providing said material in strip form.

11. The process of claim 6 wherein said metallic material providing step comprises providing said material in rod form.

12. The process of claim 6 wherein:
said metallic material providing step comprises providing a copper-base alloy; and
said aging step comprises heating said copper-base alloy to a temperature in the range of from about 500° C. to about 800° C. for a time period up to about 48 hours and forming a plurality of acicular ferromagnetic particles surrounded by a copper-rich matrix.

13. The process of claim 12 wherein said aging step comprises heating said copper-base alloy to a temperature in the range of from about 500° C. to about 700° C. for a time period in the range of from about 1 to about 8 hours.

14. Free magnetic particles having utility in recording media, said particles being produced by the process of claim 1.

* * * * *